United States Patent
Otake

(10) Patent No.: US 6,652,233 B2
(45) Date of Patent: Nov. 25, 2003

(54) CONTROL SYSTEM FOR A TURBO-CHARGED DIESEL AIRCRAFT ENGINE

(75) Inventor: Yukio Otake, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 54 days.

(21) Appl. No.: 10/043,242

(22) Filed: Jan. 14, 2002

(65) Prior Publication Data
US 2003/0133794 A1 Jul. 17, 2003

(51) Int. Cl.$^7$ ................................................ B64C 11/34
(52) U.S. Cl. .............................. 416/30; 416/35; 416/37
(58) Field of Search ............................. 416/25, 27, 29, 416/30, 31, 35, 36, 37, 42, 43, 44; 60/602, 603, 243, 233

(56) References Cited

U.S. PATENT DOCUMENTS

| 4,626,170 A | 12/1986 | Dorsch | 416/29 |
| 5,810,560 A | 9/1998 | Tanaka | 416/27 |
| 6,171,055 B1 * | 1/2001 | Vos et al. | 416/1 |

FOREIGN PATENT DOCUMENTS

| JP | A 6-50181 | 2/1994 |
| JP | A 8-303271 | 11/1996 |
| JP | A 8-324496 | 12/1996 |
| JP | A 8-326586 | 12/1996 |
| JP | A 10-18861 | 1/1998 |
| JP | A 2001-159356 | 6/2001 |

OTHER PUBLICATIONS

The Aircraft Gas Turbine Engine and Its Operation, Jun. 1952, Pratt & Whitney Aircraft, p. 118.*

* cited by examiner

Primary Examiner—Edward K. Look
Assistant Examiner—Dwayne J. White
(74) Attorney, Agent, or Firm—Oliff & Berridge, PLC

(57) ABSTRACT

In the control system for a turbo-charged diesel aircraft engine, the engine speed and the fuel injection amount are controlled by a single control lever. However, when the control lever is operated to accelerate the engine, the fuel injection amount immediately increases to the value set by the control lever while the actual speed of the engine requires a relatively long time to reach the set speed. This may cause the actual fuel injection amount to become excessively larger than a value matching the engine speed and to produce exhaust smoke. In order to prevent this problem, the control system includes a delay control device which restricts the rate of increase in the fuel injection amount to a value less than a predetermined maximum value. By restricting the rate of increase in the fuel injection amount, the actual fuel injection amount is maintained at a value matching the actual engine speed during acceleration, and the generation of the exhaust smoke does not occur.

14 Claims, 13 Drawing Sheets

CONTROL SYSTEM FOR A TURBO-CHARGED DIESEL AIRCRAFT ENGINE

BACKGROUND OF THE INVENTION

1. Field of the Invention

The present invention relates to a control system for an aircraft engine, and more specifically it relates to a control system for a turbo-charged diesel engine used for an aircraft equipped with controllable pitch propeller.

2. Description of the Related Art

In an aircraft equipped with a controllable pitch propeller, usually the engine speed and the engine output power are separately controlled. Namely, the aircraft equipped with a controllable pitch propeller is normally provided with a propeller governor that changes the propeller pitch so that the engine speed becomes a predetermined set speed. Since the power consumption of the propeller changes in accordance with the propeller pitch and the propeller speed, the engine speed (i.e., the propeller speed) changes in accordance with the propeller pitch if the engine output power is kept at constant value. Further, engine output is controlled separately from the engine speed by adjusting the amount of fuel injected into the engine when a diesel engine is used. Therefore, in the conventional control system, the pilot of the aircraft is required to adjust a governor lever for changing the set speed of the propeller governor and a throttle lever for changing the setting value for fuel injection amount (a set amount of fuel) simultaneously in order to obtain desired engine (propeller) speed and engine output.

However, in the above explained conventional control system, since the pilot is required to operate the governor lever and the throttle lever at the same time, complex work is required for controlling the aircraft.

To solve this problem, U.S. Pat. No. 5,810,560 proposes a control system for an aircraft engine in which both the set speed of propeller governor and the set amount of fuel injection is controlled by a single control lever. In U.S. Pat. No. 5,810,560, since a gasoline engine is used, the engine output is controlled by adjusting the degree of opening of a throttle valve disposed on the air intake passage of the engine, and the propeller governor and the throttle valve are connected to a single control lever by means of link and cam mechanism, and the set speed of the propeller governor and the degree of opening of the throttle valve change simultaneously in accordance with the stroke of the control lever. Therefore, when the set speed of the propeller governor becomes low, the degree of opening of the throttle valve is also set at a small value, whereby a low speed and low output power operation of the engine is automatically achieved. Similarly, when the set speed of the propeller governor becomes high, as the degree of opening of the throttle valve also becomes large, a high speed and high output power operation of the engine is automatically achieved.

According to the control system in U.S. Pat. No. 5,810,560, as the engine speed and the engine output power are controlled by a single lever, the complexity of the control of the aircraft is largely reduced. However, when the control system of U.S. Pat. No. 5,810,560 is used for a turbo-charged diesel engine, some problems occur.

In a diesel engine, as intake air amount of the engine is not controlled by a throttle valve, a combustion air-fuel ratio changes in accordance with the fuel injection amount, i.e., the engine load. Therefore, in some operating conditions, if the combustion air-fuel ratio becomes excessively low, exhaust smoke will be formed due to a shortage of the combustion air.

In order to prevent the formation of exhaust smoke, a boost compensator is used in some turbo-charged diesel engines. The boost compensator is an apparatus that restricts the fuel injection amount to a value less than a maximum limit corresponding to an allowable lowest air-fuel ratio. The allowable lowest air-fuel ratio is a lowest air-fuel ratio on which the engine can operate without forming exhaust smoke. Since the amount of air charged into cylinders of the engine increases as the boost pressure increases, the maximum limit of the fuel injection amount is determined by the boost pressure.

When the engine speed and the fuel injection amount are simultaneously controlled by a single control lever, the fuel injection amount changes in accordance with the engine speed. In this case, when the engine speed is determined, the fuel injection amount is simultaneously determined. On the other hand, the boost pressure decreases as the altitude increases even though the engine speed is constant, due to a decrease in the atmospheric pressure. Therefore, if the boost compensator is used in the single control lever system, in some cases, the boost compensator is activated to restrict the fuel injection amount at a high altitude due to a decrease in the boost pressure. In this case, once the boost compensator restricts the fuel injection amount, boost pressure does not increase any more since sufficient engine power for increasing the boost pressure is not available. Therefore, if the boost compensator is used in the single control lever system, the fuel injection amount would likely to be always controlled to the maximum amount determined by the boost pressure once the boost compensator is activated at a high altitude. When the fuel injection amount is controlled by the boost compensator, the fuel injection amount fluctuates in accordance with the fluctuation of the boost pressure. This may cause instability in the engine operation. Therefore, when the single control lever system is used, it is not preferable to use the boost compensator.

SUMMARY OF THE INVENTION

In view of the problems in the related art as set forth above, an objects of the present invention is to provide a control system for a turbo-charged diesel aircraft engine using a single control lever for controlling an engine speed and a fuel injection amount of the engine and capable of preventing the formation of the exhaust gas smoke without using a boost compensator.

The object as set forth above is achieved by a control system for a turbo-charged diesel aircraft engine, according to the present invention, comprising a controllable pitch propeller connected to and driven by the turbo-charged diesel aircraft engine, governor means for controlling the rotational speed of the propeller to a set speed by adjusting the pitch of the propeller, speed setting means for changing the set speed of the propeller governor, throttle means for changing a set amount of fuel supplied to the engine, fuel supply means for supplying fuel to the engine in an amount determined in accordance with the set amount, control means for controlling the speed setting means and the throttle means so that the set speed and the set amount of fuel change simultaneously in accordance with the stroke of a single control lever and, wherein, the control means controls the throttle means according to the stroke of the control lever in such a manner that the set amount of fuel is always smaller than a maximum limit determined in accordance with the set speed of the propeller.

According to the present invention, as the fuel injection amount is always set at a value smaller than a maximum limit determined in accordance with the set speed of the propeller, the fuel injection amount can be restricted to a value in the range where the exhaust smoke is not formed. Further, as the maximum limit of the fuel injection amount is determined in accordance with the set speed of the propeller, the maximum limit of the set amount is not changed even at a high altitude.

According to the present invention, if the maximum limit is determined in such a manner that the air-fuel ratio of the combustion determined by the engine speed and the set amount of fuel is always higher than the lower limit of the air-fuel ratio which allows the engine operation without forming exhaust smoke, the exhaust smoke can be prevented effectively.

Also, if a delay control means such as a mechanical dashpot is provided for restricting the maximum rate of increase in the set amount of fuel, the exhaust smoke can be prevented even during a transient condition such as an acceleration of the engine.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the control system for a turbo-charged diesel aircraft engine according to the present invention will be explained with reference to FIGS. 1 through 16.

Figure 1:
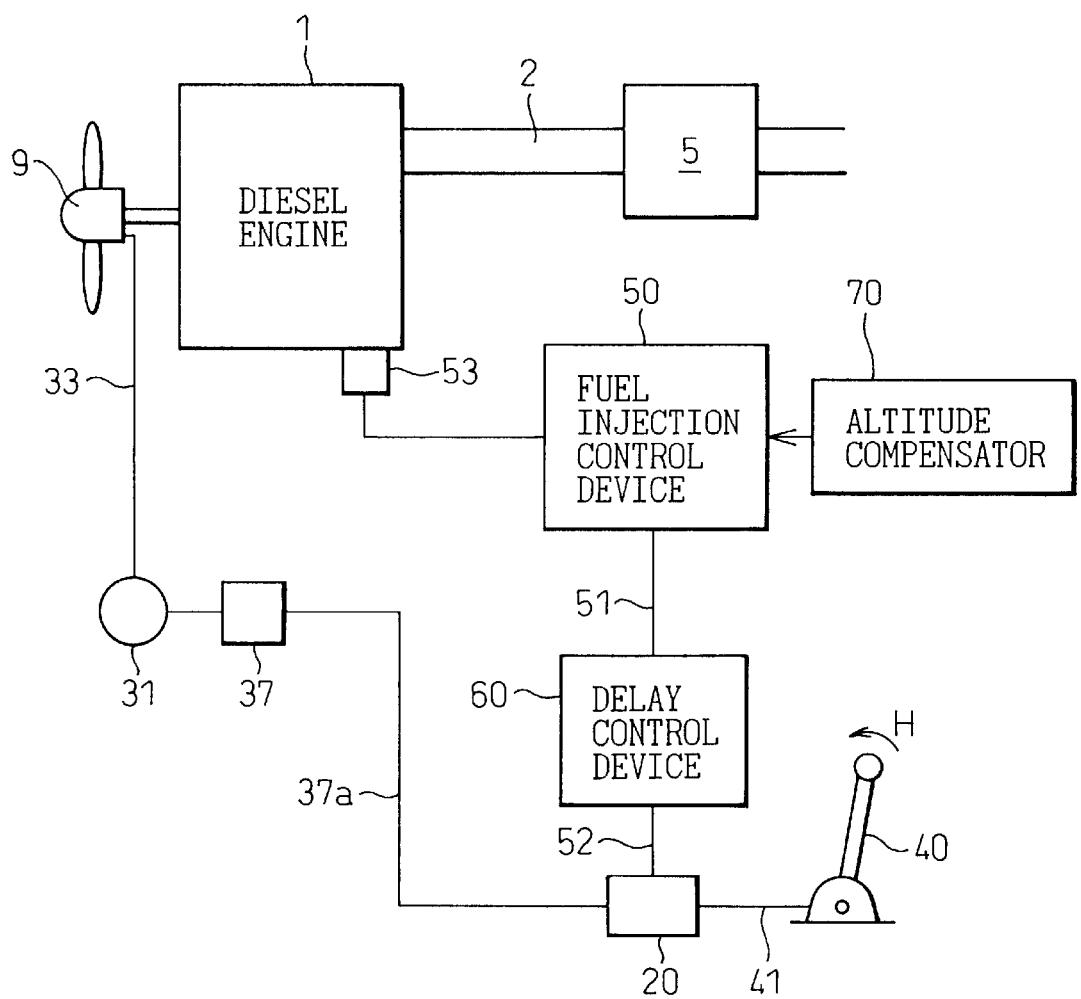
FIG. 1 shows an arrangement of an embodiment of the control system according to the present invention.

FIG. 1 schematically illustrates an embodiment of the single lever control system according to the present invention. In FIG. 1, numeral 1 designates an internal combustion engine for an aircraft. In this embodiment, the engine 1 is a multiple-cylinder type turbo-charged diesel engine. Numeral 2 designates an intake air passage of the engine 1. In the intake air passage 2, a turbo-charger 5 for pressurizing intake air of the engine is disposed.

In FIG. 1, numeral 9 designates a controllable pitch propeller connected to an output shaft of the engine and numeral 31 designates a propeller governor which is connected to the engine output shaft via a driving shaft not shown in the drawing. The propeller governor 31 is a conventional centrifugal type governor that controls the rotational speed of the propeller 9 (i.e. engine speed) at a set speed by changing the pitch of the propeller 9. Namely, when the propeller speed becomes higher than the set speed, the propeller governor 31 increases the pitch of the propeller 9. When the propeller pitch is increased, the torque absorbed by the propeller increases, and, due to the increase in the engine load, the engine speed (propeller speed) decreases accordingly. On the contrary, when the propeller speed becomes lower than the set speed, the propeller governor 31 decreases the pitch of the propeller 9 and, thereby, the torque absorbed by the propeller decreases and the engine speed increases. Thus, the engine speed (propeller speed) is controlled to the speed set by the propeller governor 31. The propeller governor 31 and a variable pitch mechanism of the propeller 9 are connected each other by a control oil pipe 33.

In FIG. 1, numeral 50 designates a fuel injection control device. The fuel injection control device 50 comprises a fuel pump (not shown) for supplying pressurized fuel to fuel injection valves 53 (only one fuel injection valve 53 is shown in FIG. 1) disposed on the respective cylinders of the engine 1. The fuel injection control device 50 is connected to a delay control device 60 explained later, by a mechanical link 51 such as a push and pull cable and controls the fuel injection amount in accordance with the displacement of the link 51.

In this embodiment, a power lever 40 is provided for adjusting both the set speed of the propeller governor 31 and the fuel injection amount set by the fuel injection device 50 simultaneously. As shown in FIG. 1, one end of the power lever 40 is connected to a control member 20 which is connected to the delay control device 60 and a speed setting mechanism 37 of the propeller governor 31 by a mechanical link 52 and 37a, respectively. In this embodiment, when the power lever 40 is operated, the control member 20 displaces the mechanical links 52 and 37a. The control member 20 includes, for example, a cam mechanism connected to at least one of the links 52 and 37a and, when the power lever 40 is operated, displaces links 52 and 37a in accordance with the amount of operation of the power lever 40. The relationship between the amounts of the displacements of the links 52, 37a and the amount of the operation of the power lever 40 are determined by the profile of the cam mechanism. As explained later, the delay control device 60 conveys the displacement of the link 52 to the link 51 while restricting the rate of change in the displacement of the link 51. Therefore, in this embodiment, the amount of the displacement of the link 51 which is connected to the fuel injection control device 50 and the amount of the displacement of the link 37a which is connected to the speed setting mechanism 37 of the propeller governor 31 change simultaneously under a predetermined mutual relationship when the power lever 40 is operated. In other words, the amount of fuel injection set by the fuel injection control device 50 changes in accordance with the set speed of the propeller governor 31 in this embodiment.

Figure 2:
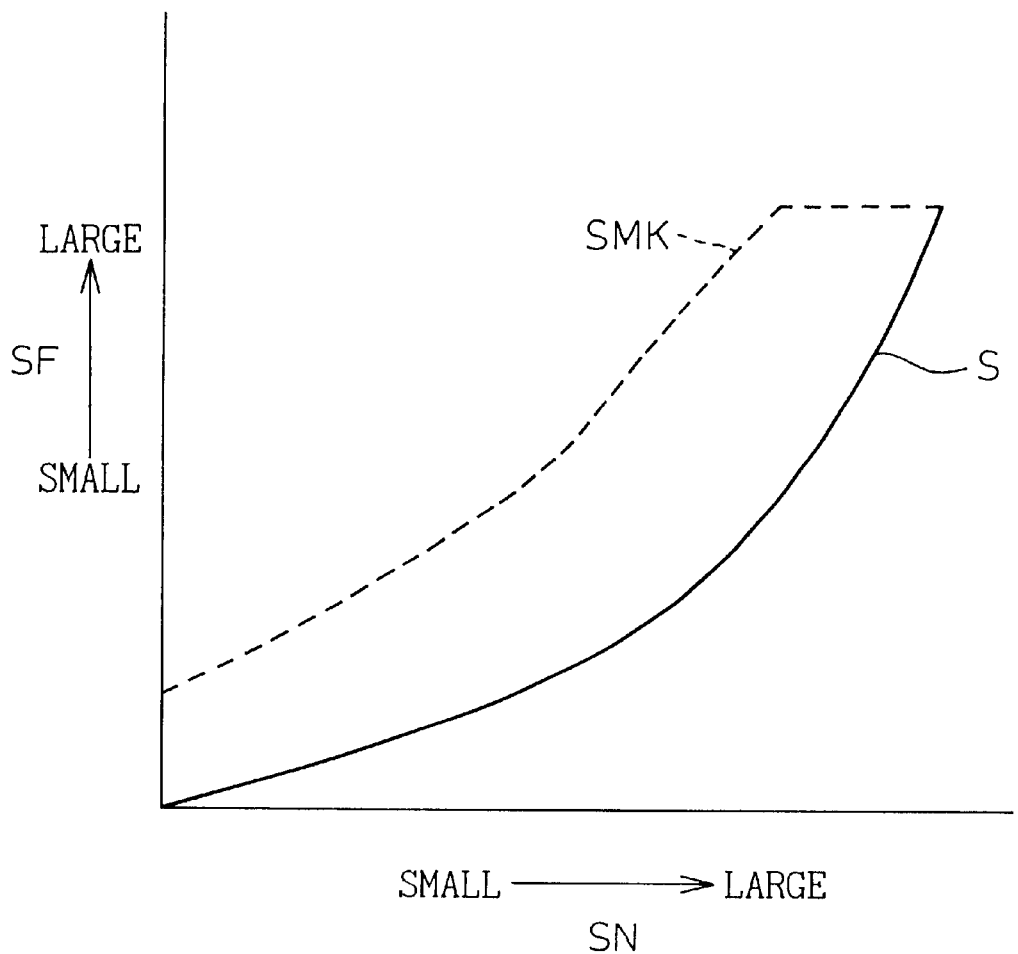
FIG. 2 shows a setting of the set amount of fuel and a smoke limit.

FIG. 2 shows the relationship between the set speed SN set by the propeller governor 31 and the set amount of fuel SF set by the fuel injection control device 50. In FIG. 2, the solid line S represents the change in the set amount of fuel SF. As shown in FIG. 2, the set amount SF increases as the set speed SN of the propeller (i.e., the engine speed) increases.

In FIG. 2, the broken line SMK represents a so-called "smoke limit". The smoke limit is a maximum amount of fuel that can be fed to the engine without producing the exhaust smoke. The smoke limit SMK in FIG. 2 is measured by increasing the fuel injection amount at the respective speed SN when the engine is operated on the ground until the exhaust smoke is produced. As can be seen from FIG. 2, the set amount of fuel SF at the respective set speed SN is set at values much lower than the smoke limit SMK in order to prevent the exhaust smoke.

As explained above, the smoke limit SMK in FIG. 2 is measured on the ground under the atmospheric pressure of 1 bar. However, when the atmospheric pressure decreases, the maximum boost pressure decreases with the atmospheric pressure. Therefore, the smoke limit SMK becomes lower as the altitude of the aircraft becomes higher. Therefore, if the set amount of fuel is controlled to the line SF in FIG. 2 regardless of the flying altitude of the aircraft, the smoke will be produced at a high altitude even though the fuel injection amount is controlled to the line SF in FIG. 2.

Therefore, in order to prevent the formation of the exhaust smoke, it is necessary to restrict the maximum fuel injection amount to a value less than the smoke limit at the respective altitudes. However, if the maximum fuel injection amount is determined in accordance with the boost pressure (i.e., if the boost compensator is used) the problem explained before occurs.

In order to prevent the problem associated with the boost compensator, the actual fuel injection amount is determined by correcting the set amount SF (i.e., the fuel injection amount when the aircraft is on the ground) by multiplying an altitude correction factor AP determined by the altitude A.

Figure 3:
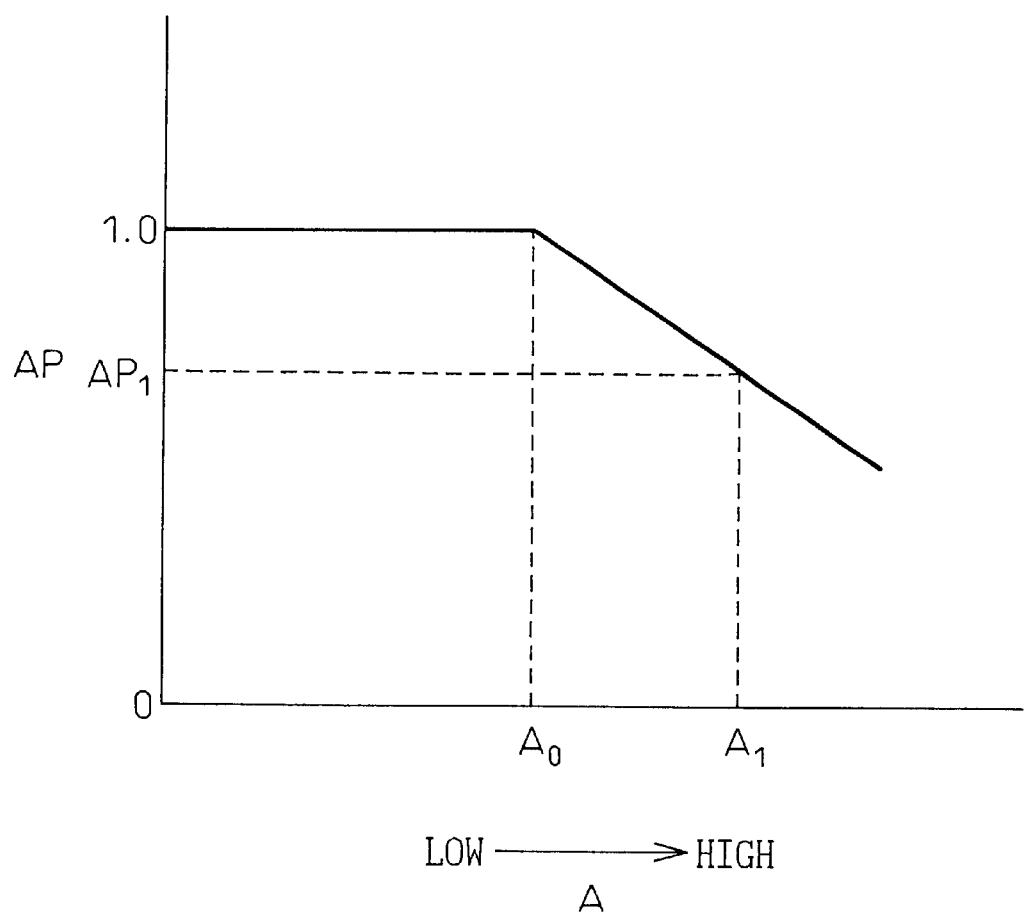
FIG. 3 shows a setting of the altitude correction factor used in the embodiment in FIG. 1.

FIG. 3 shows the altitude correction factor AP used in this embodiment. As shown in FIG. 3, the altitude correction factor AP starts to decrease linearly when the altitude becomes higher than a certain value $A_0$. In this embodiment, the actual fuel injection amount Q is obtained by SF×AP and the actual fuel injection amount becomes smaller as the altitude becomes higher even if the set speed SN is the same.

Figure 4:
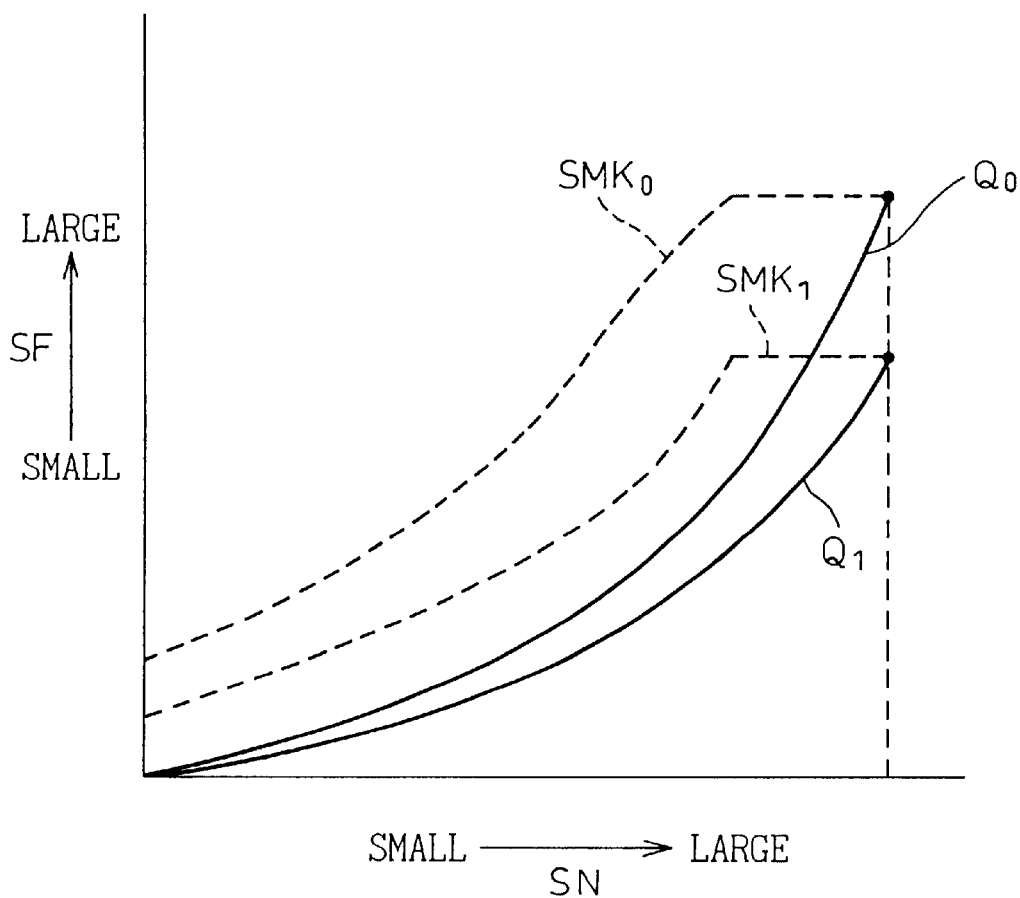
FIG. 4 shows a change in the smoke limit in accordance with altitude.

FIG. 4 shows changes in the smoke limit SMK and the actual fuel injection amount Q due to a change in the altitude. In FIG. 4, the broken line $SMK_0$ is a smoke limit when the engine is operated on the ground. The solid line $Q_0$ is an actual fuel injection amount when the engine is operated on the ground. The $SMK_0$ and $Q_0$ lines are the lines identical to lines SMK and SF in FIG. 2, respectively. Namely, the actual fuel injection amount Q of the engine is controlled to the set amount SF in FIG. 2 in this embodiment (Q=SF) when the engine is operated on the ground.

When the altitude of the aircraft becomes large, the smoke limit line lowers from $SMK_0$ and, for example, when the altitude is $A_1$, the smoke limit line moves down to $SMK_1$ in FIG. 4. In this case, if the actual fuel injection amount is controlled on the line $Q_0$, the actual fuel injection amount becomes larger than the smoke limit $SMK_1$ and the exhaust smoke will be produced.

However, in the present embodiment, the actual fuel injection amount is corrected in accordance with the altitude by multiplying altitude correction factor AP. Namely, the value of the correction factor AP is determined by the altitude in accordance with the relationship in FIG. 3 and, as can be seen from FIG. 3, the value of the correction factor AP at the altitude $A_1$ becomes $AP_1$. Therefore, when the aircraft is operated at an altitude $A_1$, the actual fuel injection amount is reduced to $Q_1=SF \times AP_1$ in this embodiment. As shown in FIG. 4, the actual fuel injection amount $Q_1$ at the altitude $A_1$ is well lower than the smoke limit $SMK_1$ at the altitude $A_1$. Thus, according to the present embodiment, the formation of the exhaust smoke is prevented without using the boost compensator.

Figure 5:
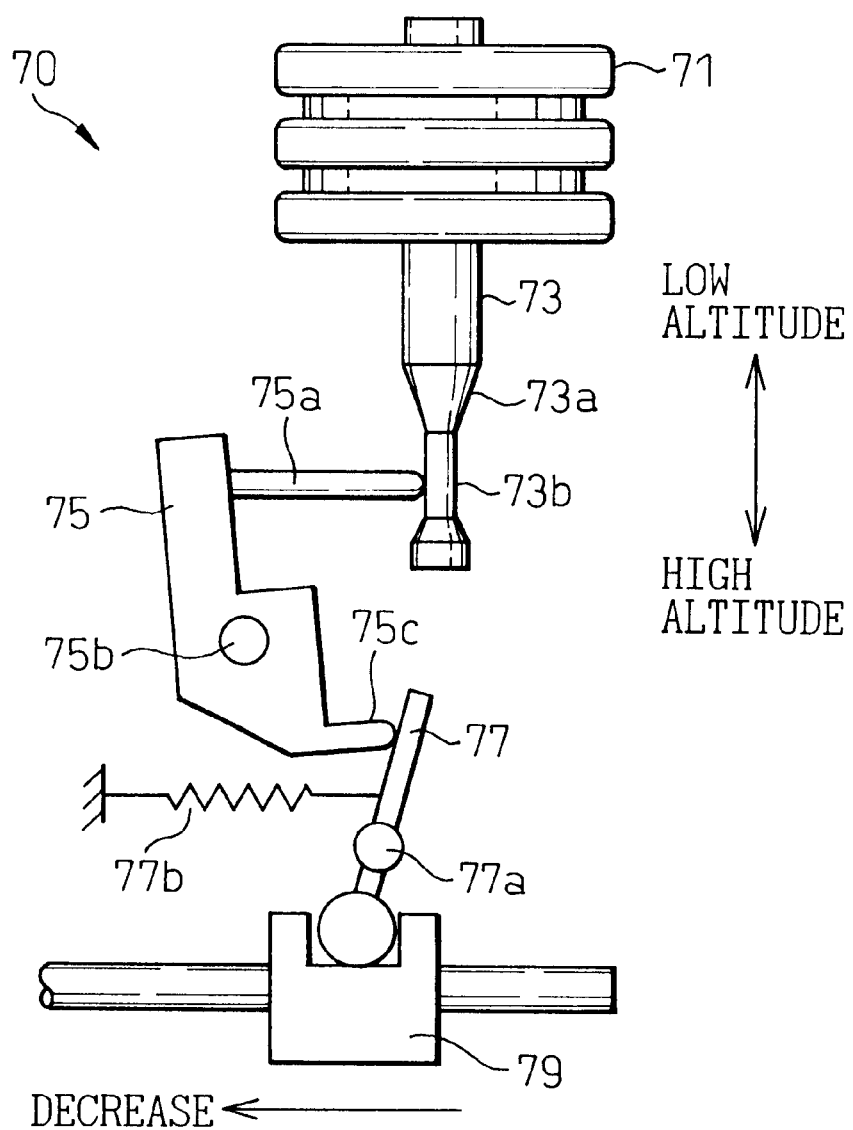
FIGS. 5 and 6 show the construction of the mechanical altitude compensator.
Figure 6:
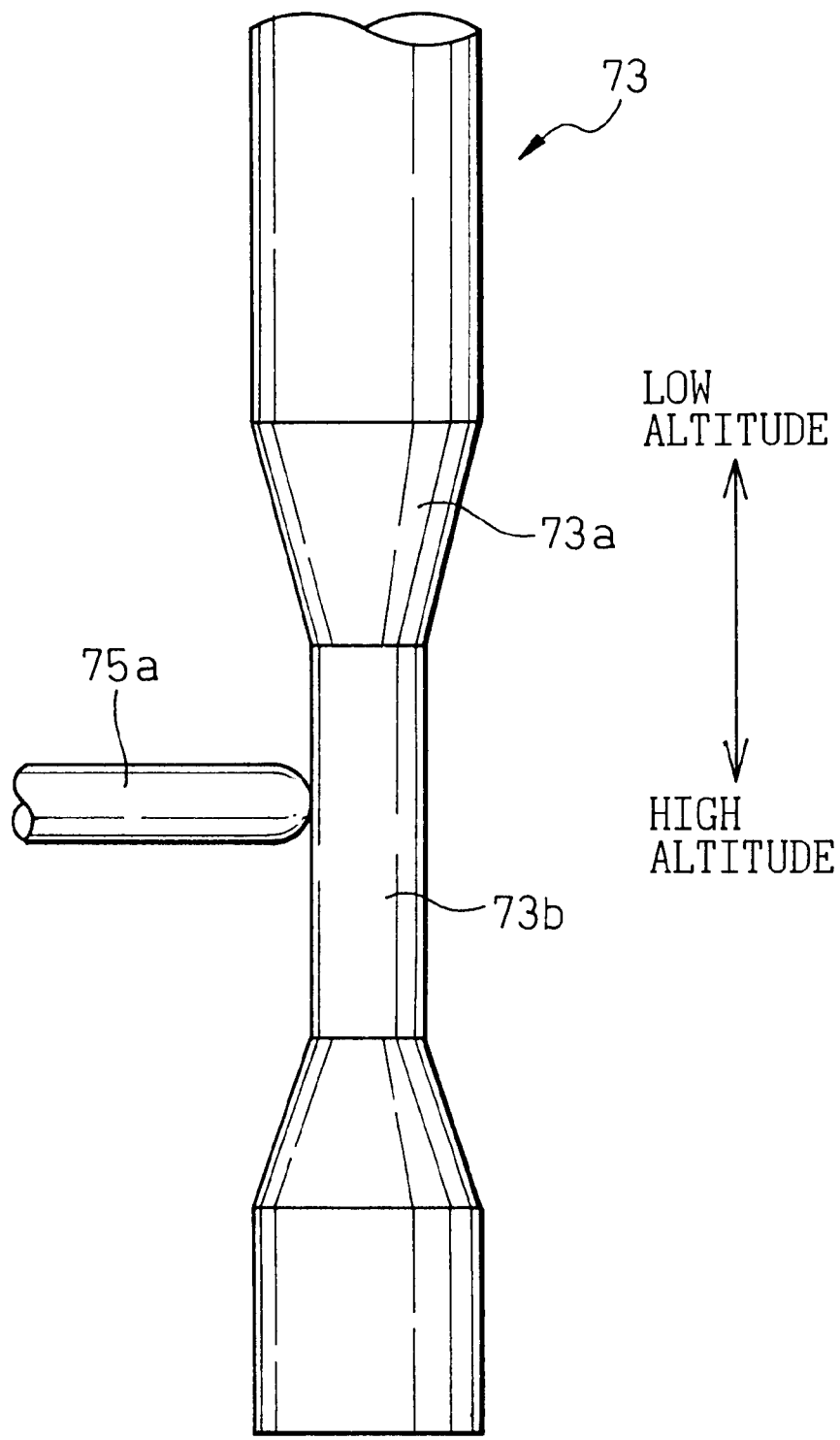

In this embodiment, the correction of the fuel injection amount according to the altitude of the aircraft, as explained above, is performed by a mechanical altitude compensator 70 in FIG. 1. FIGS. 5 and 6 illustrates the construction of the mechanical altitude compensator 70 in detail.

In FIG. 5, numeral 71 designates a sealed bellows and 73 designates a control rod connected to the bellows 71. Inside of the sealed bellows 71 is evacuated and maintained at a predetermined vacuum. Therefore, the length of the bellows 71 changes in accordance with the ambient pressure. Namely, when the aircraft is on the ground, since the atmospheric pressure is high, the bellows 71 contracts and the length of the bellows 71 becomes a minimum. Therefore, the control rod 73 also moves to upward direction in FIG. 5 and takes a position corresponding to the length of the bellows 71. When the altitude of the aircraft becomes larger, the ambient pressure becomes lower and the bellows 71 expands as the altitude increases. Therefore, the vertical position of the control rod 73 also changes in accordance with the altitude (ambient pressure).

The diameter of the control rod 73 varies in the axial direction so that a tapered portion 73a and a straight portion 73b beneath the tapered portion 73a are formed on the control rod 73.

Numeral 75 in FIG. 5 is a control arm capable of pivoting around a center pin 75b. The control arm 75 is provided with a follower 75a that contacts the side of the control rod 73 and, a push rod 75c. The push rod 75c of the control arm 75 abuts an end of the tension arm 77 that pivots around a pin 77a. The other end of the tension arm 77 is attached to a control member 79 of the fuel injection pump. 77b in FIG. 5 is a bias spring for urging the tension arm 77 toward the control arm 75. In this embodiment, the fuel injection amount is determined by the displacement of the link 51 and the displacement of the control member 79. When the control member 79 is moved to the left direction in FIG. 5, the actual fuel injection amount is decreases in proportion to the amount of displacement of the control member 79.

FIG. 6 shows a detail of the profile of the control rod 73. As explained above, the control rod 73 is provided with a tapered portion 73a where the diameter of the rod decreases toward the downward direction and a straight portion 73b continues beneath the tapered portion 73a where the diameter of the rod becomes constant. When the aircraft is on the ground, as the ambient pressure is high, the control rod 73 is contracted to upward direction in FIG. 5 by the bellows 71. In this position, the follower 75a of the control arm 75 abuts the side of the straight portion 73b of the control rod 73. After the aircraft takes-off, though the control rod 73 moves downward as the altitude of the aircraft increases, the follower 75a continues to contact the straight portion 73b until the aircraft reaches a predetermined altitude. When the aircraft reaches the predetermined altitude, the follower 75a starts to contact with the tapered portion 73a of the control rod 73 due to the downward movement of the rod 73. Therefore, after reaching the predetermined altitude, the control arm 75 turns counterclockwise as the altitude increases. This movement of the control arm 75 is transmitted to the control member 79 via the tension arm 77. Therefore, the position of the control member 79 is kept at a right-side position in FIG. 5, where the actual fuel injection amount is not reduced from the set amount until the aircraft reaches a predetermined altitude and, after reaching the predetermined altitude, the control member 79 moves toward left-side direction in FIG. 5. This causes the actual fuel amount to be reduced by a factor decreases in proportion to the altitude. Therefore, the altitude correction of the fuel injection amount, by the correction factor AP as shown in FIG. 3, is provided by the mechanical altitude compensator 70 in this embodiment.

Next, the delay control device 60 in FIG. 1 is explained. In this embodiment, the delay control device 60 is used for preventing the formation of the exhaust smoke during a transient operation of the engine such as during acceleration.

Although the formation of the exhaust smoke can be effectively suppressed by the fuel injection amount control explained above in a stable engine operation in which the engine speed and the load do not change largely, in some cases, the exhaust smoke may be formed during a transient condition, such as acceleration of the engine, even if the fuel injection amount is controlled as explained above.

Figure 7:
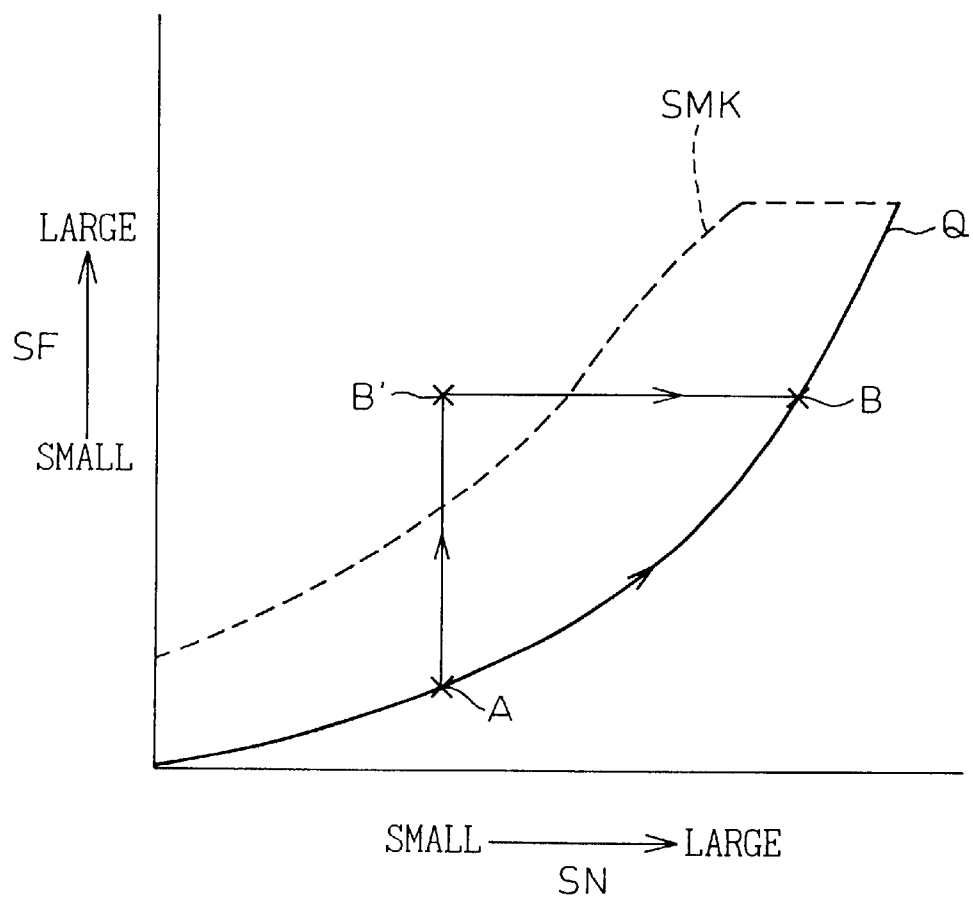
FIG. 7 is a drawing explaining the generation of the exhaust smoke during the acceleration of the engine.

This problem is explained, with reference to FIG. 7, in detail. FIG. 7 shows a typical fuel amount control line Q and a smoke limit line SMK in this embodiment. As explained before, the fuel injection amount Q is always controlled so that fuel injection amount changes along the solid line Q in a stable operation of the engine in this embodiment. Therefore, in the stable operation, the fuel injection amount Q is always kept smaller than the smoke limit SMK and, thereby, the exhaust smoke is not produced in the stable operation.

However, in a transient operation such as acceleration of the engine, when the power lever 40 is operated at a relatively high speed, the set speed SN and the set amount of fuel SF change immediately after the power lever 40 is operated. In this case, though the actual fuel injection amount Q is controlled (increased) to the set amount SF shortly after the SF is changed, the actual engine speed N requires a relatively long time to reach the set speed SN after it is changed.

Therefore, when the engine is accelerated, the actual fuel injection amount Q may exceed the smoke limit SMK in some cases. For example, consider the case where the power lever 40 is operated in order to accelerate the engine from the point A to point B. In this case, if both of the actual engine speed N and the actual fuel injection amount Q increases immediately, the engine speed and the fuel injection amount moves exactly along the solid line SF in FIG. 7 and the exhaust smoke is not formed. However, in the actual operation, since the rate of increase in the engine speed is relatively low while the rate of increase in the actual fuel injection amount is relatively high, the operation point of the engine temporarily moves to the point B' before it moves to the point B.

Although, after some time elapses, the engine speed increases to the value corresponds to the point B and the operation point eventually moves to the point B, the exhaust smoke is formed when the engine is operated at the point B. In order to prevent this problem in the transient condition, the delay control device 60 restricts the rate of the increase in the actual fuel injection amount to a maximum limit which matches the rate of increase in the actual engine speed so that the operating point of the engine always moves along the fuel control line Q in FIG. 7.

Figure 8:
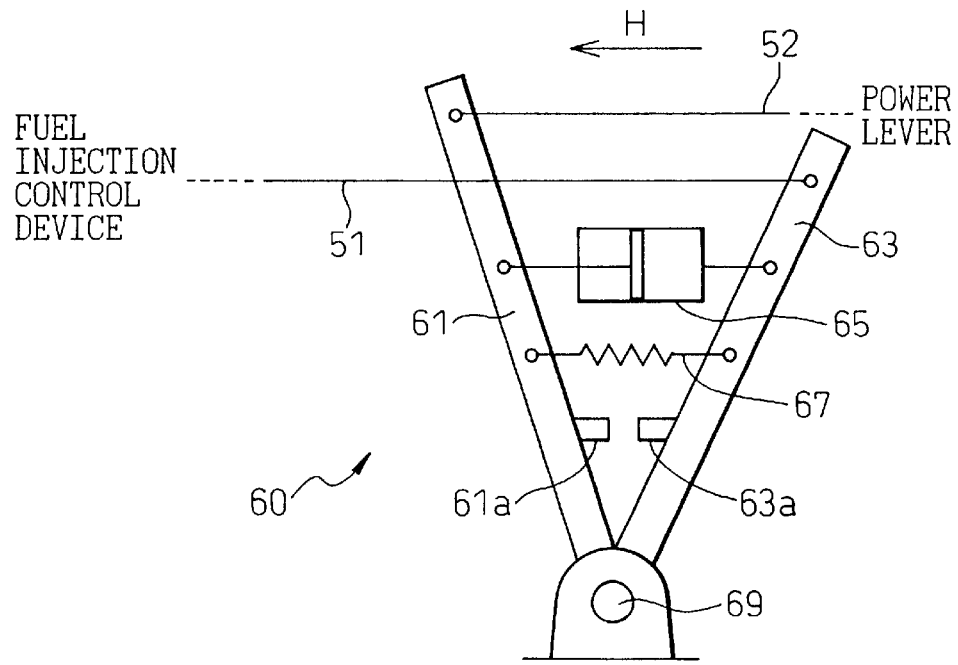
FIGS. 8 and 9 show examples of the construction of the delay control device.

In this embodiment, a mechanical delay control device 60 using a dashpot and a spring is used. FIG. 8 schematically shows the arrangement of the delay control device in this embodiment.

The delay control device 60 comprises two levers 61 and 63 attached to a common pivot 69 at one ends. The other end of one of the lever (an input lever 61) is connected to the power lever 40 and the control member 20 through the link 52. The other end of the other lever (an output lever 63) is connected to the link 51 that controls the set amount of the fuel control device 50. The control levers 61 and 63 are connected to each other through a dashpot 65 and a spring 67. The dashpot 65 and the spring 67 are arranged in parallel to each other so that the movement of the input lever 61 is transmitted to the output lever 63. Further, projections 61a and 63a acting together as a stopper for limiting a minimum angle of the levers 61 and 63 are disposed on the levers 61 and 63, respectively.

The dashpot 65 is of a conventional type including a cylinder 65a filled with viscous fluid and a piston 65b disposed in the bore of the cylinder 65a. The cylinder is connected to one of the levers 61 and 63 (in FIG. 8, to the output lever 63) and the piston 65b is connected to the other of the levers 61 and 63 (in FIG. 8, to the input lever 61). As is well known in the art, the dashpot transmits the force from the lever 61 to 63 only in a magnitude proportional to the difference in the speeds of the operations of the levers 61 and 63.

When the engine 1 is operated in a stable condition, i.e., when the power lever 40 (FIG. 1) is not operated, the levers 61 and 63 are pulled to each other by the spring 67 and take a minimum angle position where the stoppers 61a and 63a abut each other and the angle between the levers becomes minimum. When the power lever 40 moved to the direction which increases the set speed of the propellers and the set amount of fuel, the link or the push and pull cable 52 moves to the direction indicated by the arrow H in FIG. 8. Therefore, when the set amount of fuel is increased, the input lever 61 is pushed by the link 52 and turns in the counterclockwise direction in FIG. 8.

When the input lever 61 is turned counterclockwise direction at a certain speed, the output lever 63 does not move in unison with the input lever 61. Since the force transmitted from the input lever 61 to the output lever 63 is proportional to the difference between the moving speeds of the input lever 61 and output lever 63, some difference in speeds is required in order to transmit enough force through the dashpot 65 to move the output lever 63 against the reaction force transmitted to the same through the link 51. Therefore, when the input lever 61 turns counterclockwise, the output lever 63 also turns counterclockwise, but with a speed smaller than turning speed of the input lever 61.

Therefore, when the set amount of fuel is increased, the rate of increase of the set amount of fuel (i.e., the movement of the link 51) becomes smaller than the movement of the link 52. Since the output lever 63 in FIG. 8 moves at a speed lower than that of the input lever 61, the angle between the levers 61 and 63 increases when the set amount of fuel is increased. This increase in the angle between the levers 61 and 63 extends the spring 67 resiliently. Therefore, the output lever 63 continues to move toward the input lever 61 by the resilient force of the spring 67 even after the input lever 61 stops until the angle between the levers 61 and 63 becomes a minimum, i.e., until the stoppers 61a and 63a abut each other. Thus, the position of the output lever 63 and the displacement of the link 51, i.e., the set amount of fuel eventually becomes the value corresponding to the position of the power lever 40 and the displacement of the link 52.

As explained above, when the power lever 40 is operated in the direction increasing the set speed of propeller and the set amount of fuel injection, the rate of increase in the set amount of fuel becomes smaller than the movement of the power lever 40, i.e., the rate of increase in the fuel injection amount is restricted while the set speed of the propeller increases at the rate corresponding to the movement of the power lever 40. Therefore, the increase in the set amount of fuel injection is delayed compared with the increase in the set speed of propeller. This causes the actual fuel injection amount and the actual propeller speed to increase from the point A to the point B along the solid line in FIG. 7 and the actual fuel injection amount does not exceed the smoke limit (the broken line in FIG. 7) during the acceleration of the engine. Therefore, according to the present embodiment, the formation of exhaust smoke can be suppressed during the acceleration of the engine.

Further, when the power lever 40 is moved to the direction decreasing the set amount of fuel injection, the link 52 in FIG. 8 drives the input lever 61 in the clockwise direction. In this case, since the levers 61 and 63 are in the minimum angle position where the stoppers 61a and 63a abut each other before the operation of the power lever 40 is started, the output lever 63 turns in unison with the input lever 61. This causes the set amount of fuel to decrease at a rate corresponding to the movement of the power lever 40 during the deceleration of the engine. In other words, no delay exists in the rate of decrease in the set amount of fuel during the deceleration of the engine.

Although the delay control device 60 restricts only the rate of increase in the set amount of fuel in the embodiment explained above, the delay control device 60 may restrict both rate of increase in the set amount of fuel and the propeller speed. In this case, the delay control device having a same construction as the device 60 in FIG. 8 is disposed on the link 41 between the power lever 40 and the control member 20 in FIG. 1 and restricts the rate of increase in both the set speed of propeller and the set amount of fuel.

Figure 9:
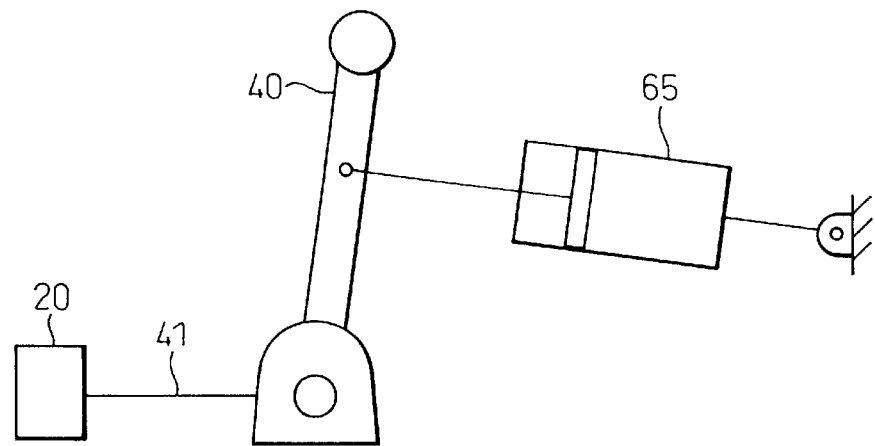

Further, instead of the delay control device 60 using a dashpot 65 and spring 67 in FIG. 8, a dashpot 65 only may be directly connected to the power lever 40 as shown in FIG. 9. In this case, the speed of operation of the power lever itself is restricted by the dashpot 65 and the rate of the decrease, as well as the rate of the increase, in both set amount of fuel and the set speed of propeller, are restricted by the dashpot 65.

Next, another embodiment of the present invention will be explained.

In the embodiments explained above, the rate of increase in the set amount of fuel (or, both set amount of fuel and set speed of propeller) is always restricted (delayed) to prevent the exhaust smoke. In these embodiments, it is preferable to set the magnitude of restriction or delay large to some extent in order to prevent the exhaust smoke completely. However, if the magnitude of restriction or delay is large, the response of the engine during the acceleration of the engine deteriorates.

Further, the magnitude of the restriction or delay required for preventing the exhaust smoke changes in accordance with the flight conditions of the aircraft.

Figure 10:
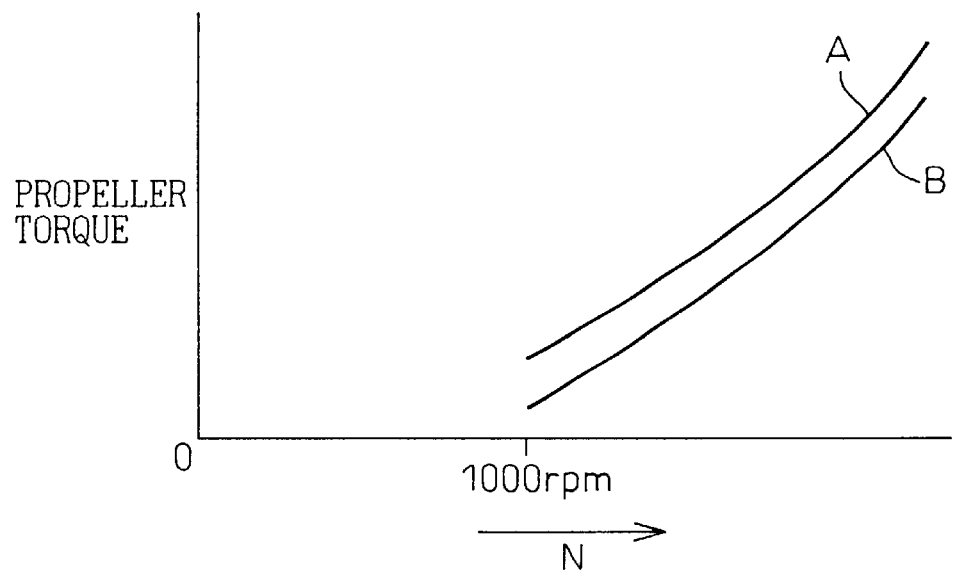
FIGS. 10 and 11 are drawings explaining the changes in the acceleration of the engine due to the difference in the true airspeed of the aircraft.

For example, the response of the engine, i.e., the time required for increasing the propeller speed, changes in accordance with the flight speed (the true airspeed) of the aircraft. FIG. 10 shows the change in the torque absorbed by the propeller due to the change in the true airspeed of the aircraft.

Figure 11:
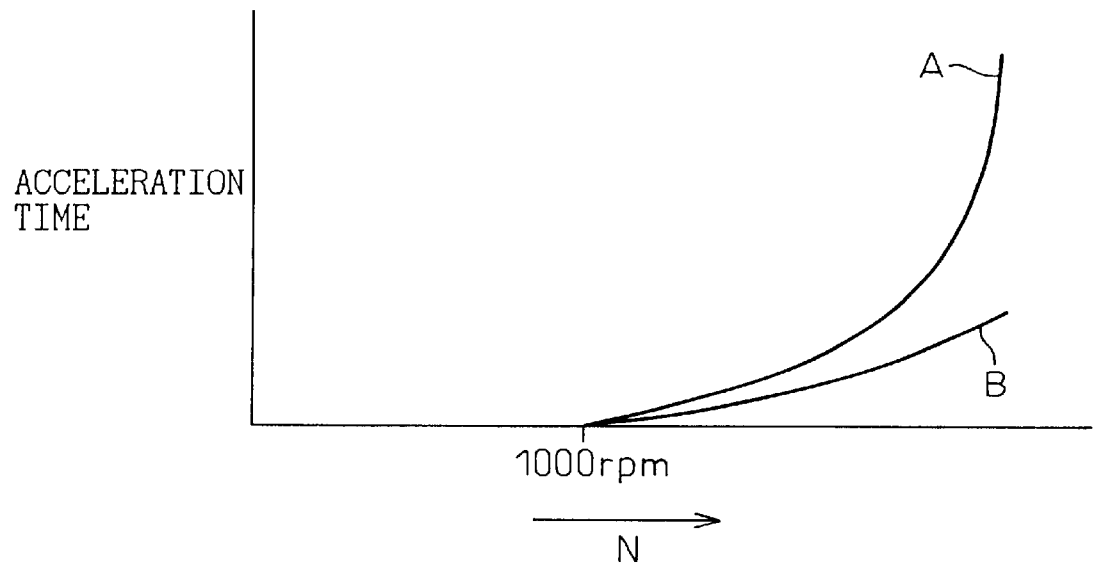

In FIG. 10, the vertical axis represents the torque T absorbed by the propeller and the horizontal axis represents the propeller (engine) rotation speed N. The lines A and B in FIG. 10 shows the torque-rotation speed curves when the aircraft is standing still (the true airspeed V=0) (curve A) and when the true airspeed is approximately 110 km/h (60 knots) (curve B). When the true airspeed of the aircraft increases, as the velocity of air flow into the propeller also increases, the torque absorbed by the propeller decreases if the propeller speed is constant. This means that, when the true airspeed of the aircraft is higher, the propeller is "lighter" and the propeller speed (engine speed) increases in a shorter time during acceleration. FIG. 11 shows the time required for accelerating the propeller from 1000 rpm to various speeds when the true airspeed V=0 (curve A) and V=60 knots (curve B). As can be seen from FIG. 11, when the true airspeed V is 60 knots, the acceleration of the propeller is largely improved compared with the case where the aircraft is at a standstill.

It would be understood from the above explanation, since the propeller becomes "lighter" as the true airspeed of the aircraft increases, the magnitude of the restriction or delay in the rate of the increase of the fuel injection amount required for suppress the exhaust smoke during the acceleration becomes smaller as the true airspeed of the aircraft increases. Therefore, it is preferable to decrease the magnitude of the restriction in order to obtain a better acceleration when the true airspeed is high. In this embodiment, therefore, the magnitude of the restriction by the delay control device 60 is changed in accordance with the true airspeed of the aircraft.

In this case, the magnitude of the restriction by the delay control device 60 may be continuously changed in accordance with the true airspeed detected by a speed detector. However, in this embodiment, the magnitude of the restriction is switched between two levels according to whether or not the true airspeed of the aircraft is higher than a predetermined value in order to simplify the control system. Further, as the predetermined speed for switching the magnitude of the restriction, a minimum takeoff speed is used. The minimum takeoff speed is a true airspeed of the aircraft which allows the aircraft to take off and, in this embodiment, whether the true airspeed is higher than the minimum takeoff speed is determined on the basis whether or not the landing gear of the aircraft is touching the ground. When the landing gear is touching the ground, it is considered the true airspeed of the aircraft is always lower than the minimum takeoff speed and, in this embodiment, the magnitude of the restriction or delay of the delay control device 60 is increased.

Figure 12:
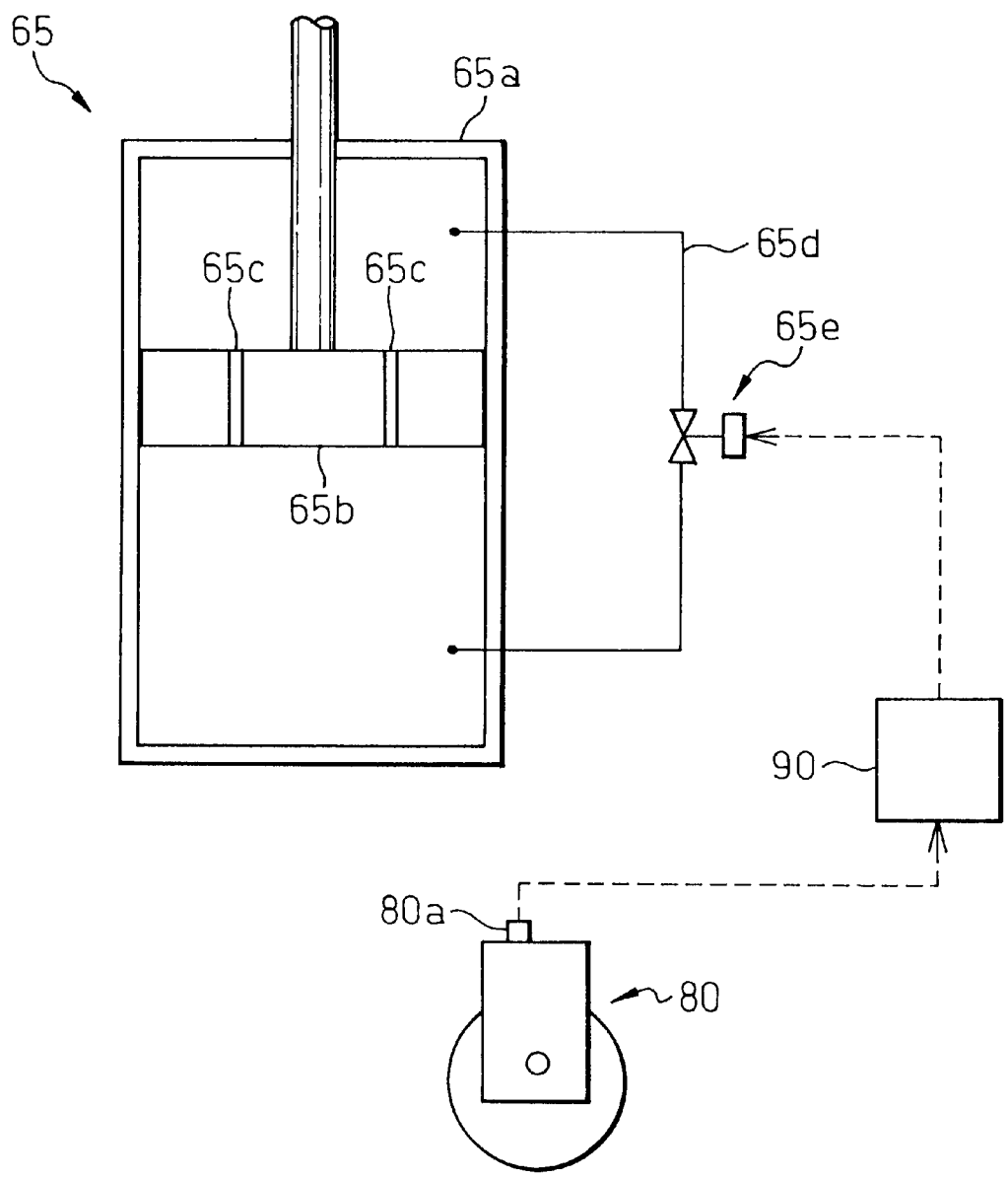
FIG. 12 shows an example of a mechanism for changing the magnitude of the delay by the dashpot.

FIG. 12 shows an example of the mechanism for changing the magnitude of the restriction used in this embodiment. In FIG. 12, the mechanism for changing the magnitude of restriction of the delay control device comprises a bypass passage 65d connecting the cylinder chambers of the dashpot 65 separated by the piston 65b and a solenoid shutoff valve 65e disposed on the bypass passage 65d. As is well known in the art, the magnitude of the restriction by the dashpot 65 is determined by the sizes of the fluid passages connecting the chambers on both sides of the piston 65b. When the solenoid valve 65e is closed, the fluid chambers on both sides of the piston are connected only by the fluid passages 65c piercing through the piston 65b. In this condition, the magnitude of the restriction of the dashpot 65 becomes relatively large since the fluid chambers on both sides of the piston only communicate through the fluid passages 65c on the piston 65b. However, when the solenoid valve 65e is opened, the fluid chambers on both sides of the piston 65b are connected by the bypass passage 65d in addition to the fluid passages 65c on the piston 65b. Therefore, when the solenoid valve 65e is opened, the magnitude of the restriction or delay of the dashpot becomes relatively low.

In FIG. 12, numeral 80 designates a landing gear of the aircraft and 80a designates load sensor disposed on the landing gear 80. When the aircraft is on the ground, since the landing gear 80 supports the aircraft, the load sensor 80a outputs a load signal. In this embodiment, the output signal of the load sensor 80 is supplied to a control device 90. When the control device 90 receives the signal from the load sensor 80a, the control device 90 closes the solenoid valve 65e. Thus, when the landing gear 80 is touching the ground, i.e., when the true airspeed of the aircraft is relatively low, the magnitude of the restriction by the dashpot is increased. Further, when the aircraft takes off, the load sensor 80a does not output the load signal, the control device 90 opens the solenoid valve 65e. Thus, when the aircraft is flying, i.e., when the true airspeed of the aircraft is relatively high, the magnitude of the restriction of the dashpot 65 is decreased. Therefore, according to this embodiment, the magnitude of the restriction or delay is changed in accordance with the true airspeed of the aircraft and the generation of the exhaust smoke can be effectively suppressed without deteriorating the response of the engine during the acceleration.

Next, another embodiment of the present invention is explained. In the previous embodiments, all of the required control is achieved using mechanical devices such as dashpot 65 and the altitude compensator 70. However, control substantially the same as the previous embodiments can be achieved by an electronic control system.

Figure 13:
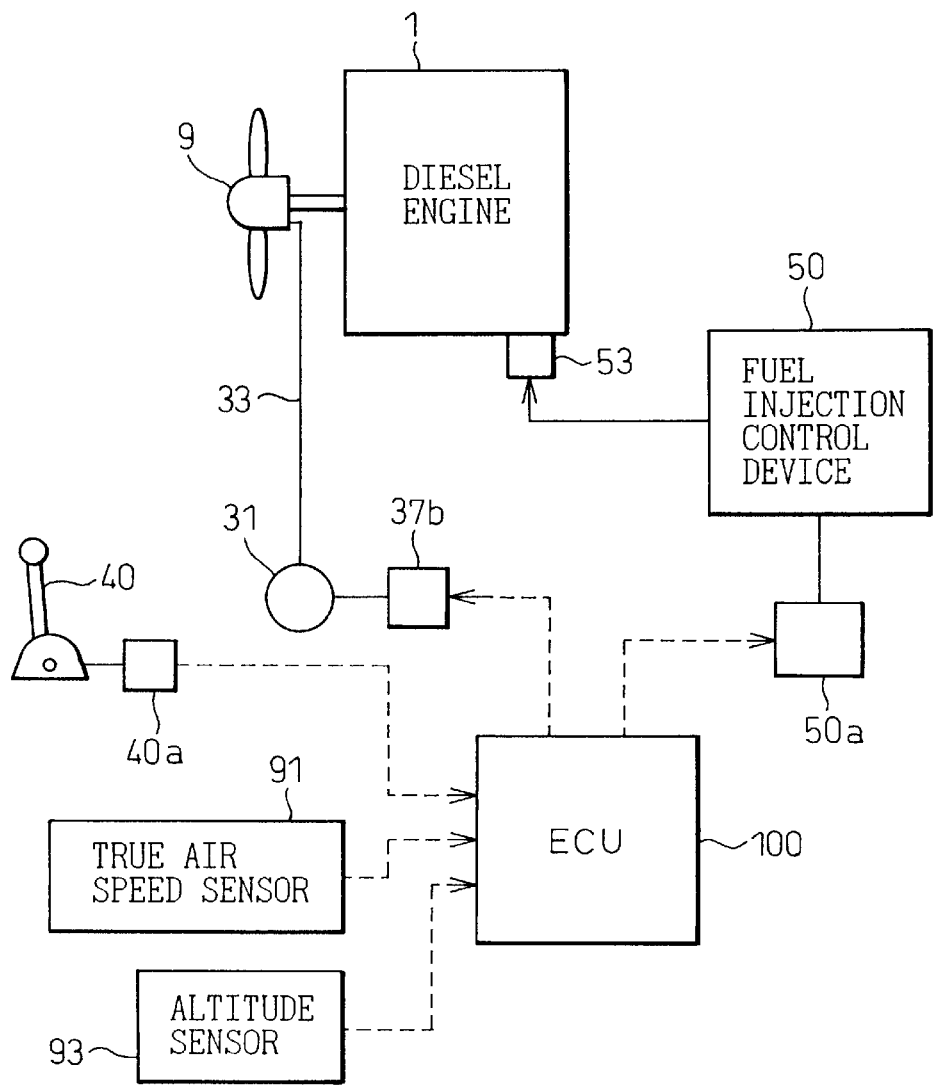
FIG. 13 shows an arrangement of the control device according to the present invention using an electronic control system.

FIG. 13 shows an embodiment of the present invention in which an electronic control system is used.

In FIG. 13, reference numerals the same as those in the previous embodiment represent similar elements.

In FIG. 13, numeral 100 designates an electronic control unit (ECU) which comprises, for example, a conventional microcomputer. In this embodiment, the position of the power lever 40 is converted to a position signal by a stroke sensor 40a, and this signal is supplied to the ECU 100. Further, an altitude signal and speed signal which represent the flying altitude and the true airspeed of the aircraft is supplied to the ECU 100 by an altitude sensor 93 and true airspeed sensor 91, respectively. Further, the fuel injection control device 50 and the speed setting mechanism 37 of the propeller governor 31 are actuated by actuators 50a and 37b controlled by the ECU 100. As the actuators 50a and 37b, for example, an electric type actuator such as a stepper motor is used.

Figure 14:
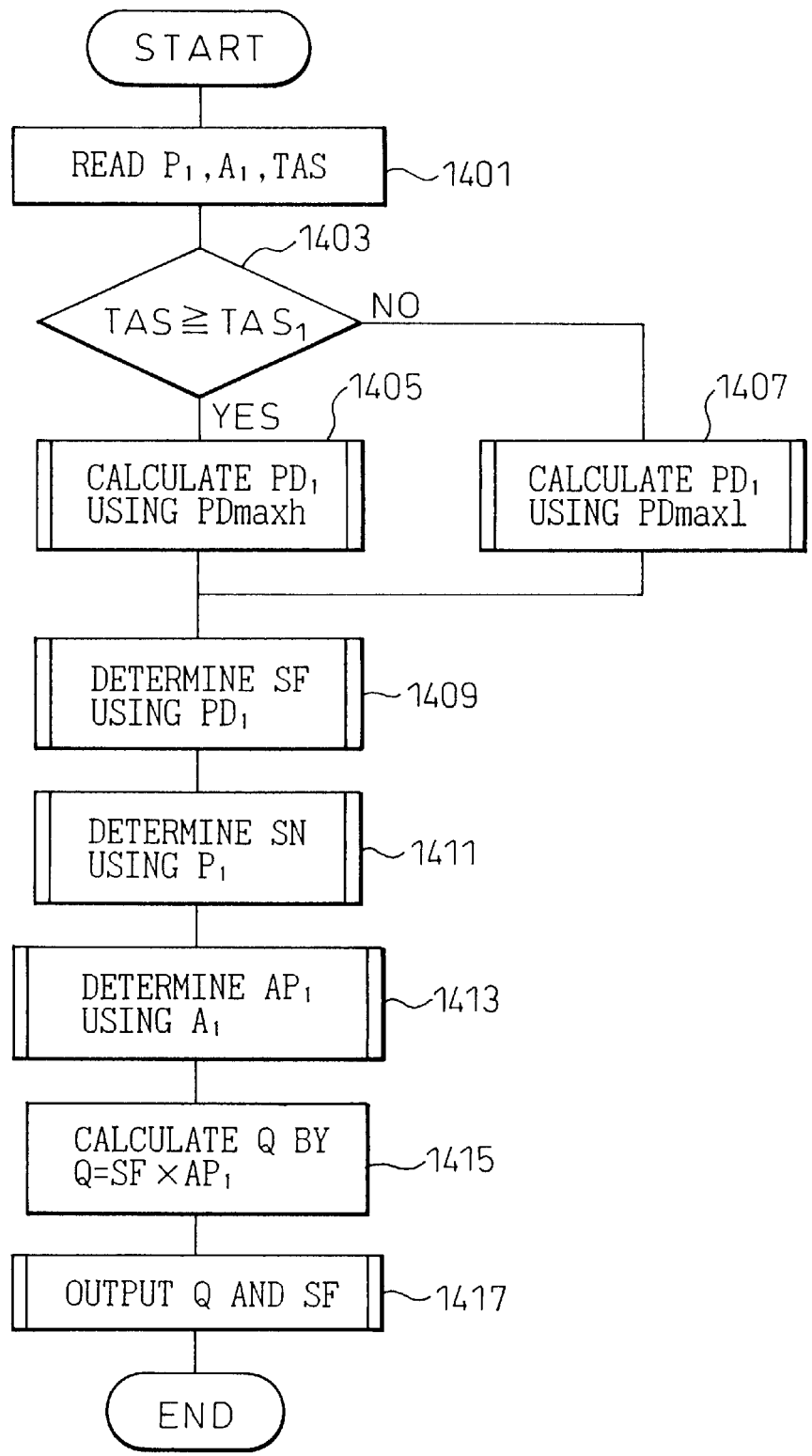
FIG. 14 is a flowchart explaining the control operation performed by the control system in FIG. 13.

FIG. 14 is an example of the flowchart explaining the control operation performed by the ECU 100 in FIG. 13. This control operation is performed by a routine executed by the ECU 100 at predetermined intervals.

In FIG. 14, at step 1401, the ECU 100 reads the stroke $P_1$ of the power lever 40, the altitude $A_1$ and the true airspeed TAS of the aircraft from the stroke sensor 40a, the altitude sensor 93 and the speed sensor 91, respectively.

At step 1403 the ECU 100 determines whether the true airspeed TAS is higher than a predetermined speed $TAS_1$. The $TAS_1$ may be set at a minimum takeoff speed in this embodiment. The steps 1405 and 1407 are steps for changing the magnitude of restriction or delay in the rate of increasing the fuel injection amount in accordance with the true airspeed of the aircraft. When the TAS is higher than $TAS_1$, i.e., when the true airspeed of the aircraft is relatively high, the delayed stroke $PD_1$ is determined in accordance with the rate of increase in the stroke P1 and a predetermined maximum limit of the increasing rate of the stroke P1. In this embodiment, a maximum limit is imposed on the rate of the increase in the delayed stroke $PD_1$ and, when the increasing rate of the actual stroke $P_1$ of the power lever 40 is higher than the maximum limit of $PD_1$, the delayed stroke $PD_1$ is restricted to the maximum limit.

In other words, when the rate of increase in the stroke of the power lever 40 is higher than the maximum limit PDmax, the delayed stroke $PD_1$ increases only at the rate PDmax until the value of the delayed stroke $PD_1$ reaches the actual stroke $P_1$. At step 1405, the delayed stroke $PD_1$ is calculated using the maximum limit PDmaxh for a high true airspeed.

When the true airspeed TAS is lower than $TAS_1$, the delayed stroke $PD_1$ is calculated using the maximum limit PDmaxl for low true airspeed. The maximum limit PDmaxh used at step 1405 is set at a value larger than the maximum limit PDmaxl for a low true airspeed used at step 1407. Therefore, when the true airspeed is high, the amount of fuel injection is allowed to increase at a rate higher than that in the case where the true airspeed is low.

Instead of using the actual true airspeed detected by the speed sensor 91, the steps 1405 and 1407 may be performed in accordance with whether the landing gear is touching the ground as explained before.

Figure 15:
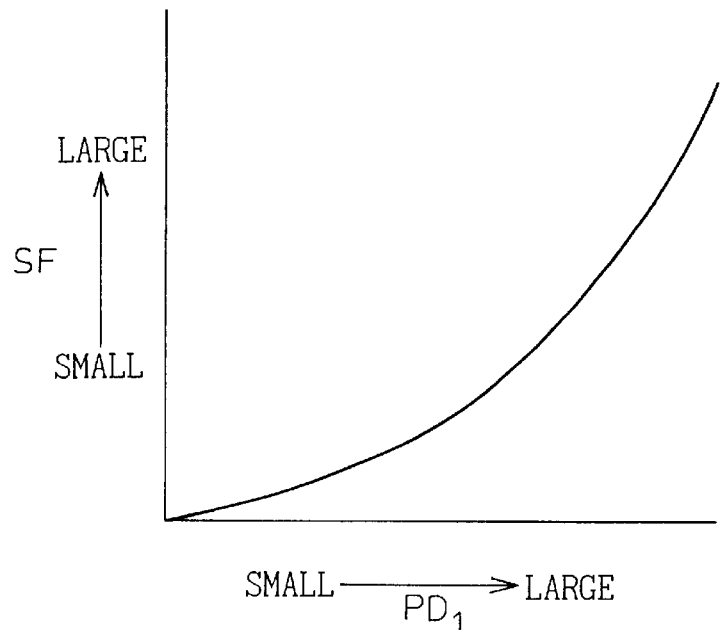
FIGS. 15 and 16 show the setting of the fuel injection amount and the set speed of the propeller governor.
Figure 16:
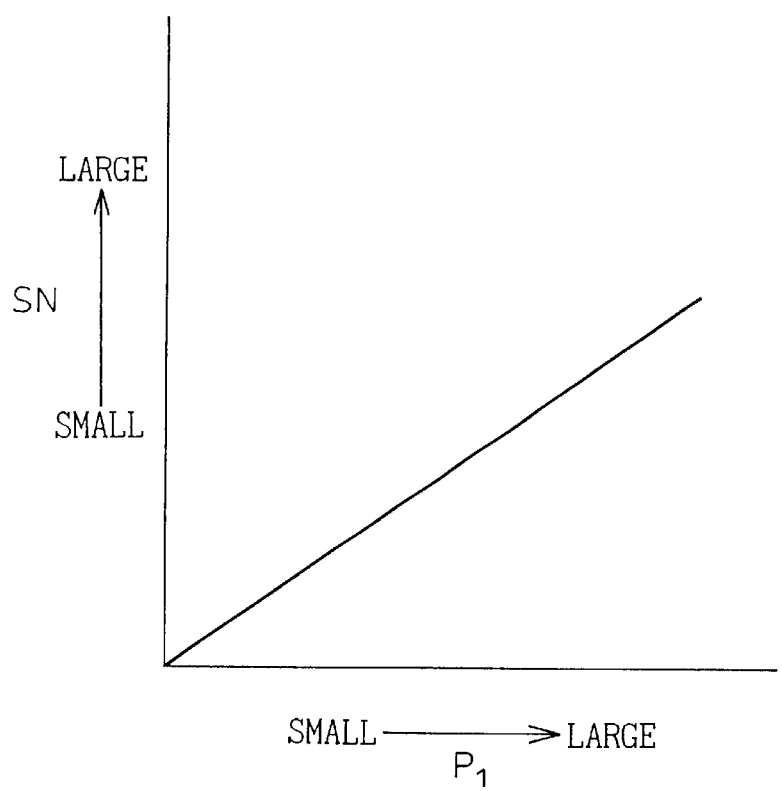

After delayed stroke $PD_1$ is determined at either of steps 1405 and 1407, the set amount SF of the fuel injection is determined using the delayed stroke $PD_1$ at step 1409. FIG. 15 shows the relationship between the set amount SF of the fuel injection and the delayed stroke $PD_1$. The set amount SF is determined based on the relationship in FIG. 15. After determining set amount SF of the fuel injection, the set speed SN of the propeller governor is determined in accordance with the actual stroke $P_1$ of the power lever 40. FIG. 16 shows the relationship between the actual stroke $P_1$ of the power lever 40 and the set speed SN of the propeller governor. As shown in FIG. 16, the set speed SN changes in proportion to the actual stroke $P_1$. In this embodiment, the relationships in FIGS. 15 and 16 are determined in such a manner that relationship between the set amount SF of fuel injection and the set speed SN is represented by the solid line in FIG. 2 in order to suppress the generation of the exhaust smoke.

After determining SF and SN, the ECU 100 calculates an altitude correction factor $AP_1$ in accordance with the altitude $A_1$ detected by the altitude sensor 93 using the relationship shown in FIG. 2. The actual amount of fuel injection Q is calculated at step 1415 by multiplying the set amount SF by the altitude correction factor $AP_1$. The actual fuel injection amount Q and the set speed SF of the propeller governor is fed to the actuators 50a and 37b of the fuel injection control device 50 and the speed setting mechanism 37, respectively.

According to the electronic control system in the present embodiment, the exhaust smoke is effectively suppressed without deteriorating the response of the engine during the acceleration.

What is claimed is:

1. A control system for a turbo-charged diesel aircraft engine comprising:
   a controllable pitch propeller connected to and driven by the turbo-charged diesel aircraft engine;
   governor means for controlling the rotational speed of the propeller to a set speed by adjusting the pitch of the propeller;

speed setting means for changing the set speed of the governor means;

throttle means for changing a set amount of fuel supplied to the engine;

fuel supply means for supplying fuel to the engine by an amount determined in accordance with the set amount;

control means for controlling the speed setting means and the throttle means so that the set speed and the set amount of fuel change simultaneously in accordance with the stroke of a single control lever, the control means comprising delay control means for restricting the rate of change in the set amount of fuel to smaller than a predetermined value when the set amount of fuel supplied to the engine is increased; and wherein the control means controls the throttle means according to the stroke of the control lever in such a manner that the set amount of fuel is always smaller than a maximum limit determined in accordance with the set speed of the propeller.

2. A control system for a turbo-charged diesel aircraft engine as set forth in claim 1, wherein the maximum limit of the set amount of fuel is determined in accordance with the set speed of the propeller so that an air-fuel ratio of combustion of the engine calculated based on the set amount of fuel is always higher than a predetermined lower limit value.

3. A control system for a turbo-charged diesel aircraft engine as set forth in claim 1, wherein the fuel supply means determines the amount of fuel actually supplied to the engine by adjusting the set amount of fuel based on the altitude of the aircraft.

4. A control system for a turbo-charged diesel aircraft engine as set forth in claim 1, wherein the throttle means is connected to the control lever by a connecting member and changes the set amount of fuel in accordance with the stroke of the control lever transmitted to the throttle means by the connecting member and wherein the delay control means comprises a dashpot mechanism disposed on the connecting member which delays the movement transmitted to the throttle means through the connecting member.

5. A control system for a turbo-charged diesel aircraft engine as set forth in claim 4, wherein the magnitude of the delay by the delay control means is determined in accordance with flight conditions of the aircraft.

6. A control system for a turbo-charged diesel aircraft engine set forth in claim 1, wherein the throttle means is connected to the control lever and changes the set amount of fuel in accordance with the stroke of the control lever and wherein the delay control means comprises a dashpot mechanism connected to the control lever to a stationary member in order to restrict the speed of the movement of the control lever to less than a predetermined speed.

7. A control system for a turbo-charged diesel aircraft engine as set forth in claim 6, wherein the predetermined speed to which the speed of movement of the control lever is restricted is determined in accordance with flight conditions of the aircraft.

8. A control system for a turbo-charged diesel aircraft engine as set forth in claim 1, wherein the predetermined value for the rate of the change in the set amount of fuel is determined in accordance with flight conditions of the aircraft.

9. A control system for a turbo-charged diesel aircraft engine as set forth in claim 8, wherein the flight conditions of the aircraft include at least the condition whether the aircraft is on the ground or is flying.

10. A control system for a turbo-charged diesel aircraft engine as set forth in claim 9, wherein the fuel supply means determines the amount of fuel actually supplied to the engine by adjusting the set amount of fuel based on the altitude of the aircraft.

11. A control system for a turbo-charged diesel aircraft engine as set forth in claim 8, wherein the flight conditions of the aircraft include at least the true airspeed of the aircraft.

12. A control system for a turbo-charged diesel aircraft engine as set forth in claim 11, wherein the fuel supply means determines the amount of fuel actually supplied to the engine by adjusting the set amount of fuel based on the altitude of the aircraft.

13. A control system for a turbo-charged diesel aircraft engine comprising:

a controllable pitch propeller connected to and driven by the turbo-charged diesel aircraft engine;

governor means for controlling the rotational speed of the propeller to a set speed by adjusting the pitch of the propeller;

speed setting means for changing the set speed of the governor means;

throttle means for changing a set amount of fuel supplied to the engine;

fuel supply means for supplying fuel to the engine by an amount determined in accordance with the set amount;

control means for controlling the speed setting means and the throttle means so that the set speed and the set amount of fuel change simultaneously in accordance with the stroke of a single control lever; and wherein the control means controls the throttle means according to the stroke of the control lever in such a manner that the set amount of fuel is always smaller than a maximum limit determined in accordance with the set speed of the propeller, and wherein the maximum limit of the set amount of fuel is determined in accordance with the set speed of the propeller so that an air-fuel ration of combustion of the engine calculated based on the set amount of fuel is always higher than a predetermined lower limit value.

14. A control system for a turbo-charged diesel aircraft engine comprising:

a controllable pitch propeller connected to and driven by the turbo-charged diesel aircraft engine;

governor means for controlling the rotational speed of the propeller to a set speed by adjusting the pitch of the propeller;

speed setting means for changing the set speed of the governor means;

throttle means for changing a set amount of fuel supplied to the engine;

fuel supply means for supplying fuel to the engine by an amount determined in accordance with the set amount;

control means for controlling the speed setting means and the throttle means so that the set speed and the set amount of fuel change simultaneously in accordance with the stroke of a single control lever; and wherein the control means controls the throttle means according to the stroke of the control lever in such a manner that the set amount of fuel is always smaller than a maximum limit determined in accordance with the set speed of the propeller, and wherein the fuel supply means determines the amount of fuel actually supplied to the engine by adjusting the set amount of fuel based on the altitude of the aircraft.

* * * * *